Nov. 4, 1969 L. O. HEGSTAD 3,476,151

WATER SOFTENER VALVE

Filed March 18, 1968 2 Sheets-Sheet 1

INVENTOR
Lester O. Hegstad
by Wolfe, Hubbard, Voit & Osann
ATTORNEY

Nov. 4, 1969  L. O. HEGSTAD  3,476,151
WATER SOFTENER VALVE
Filed March 18, 1968  2 Sheets-Sheet 2
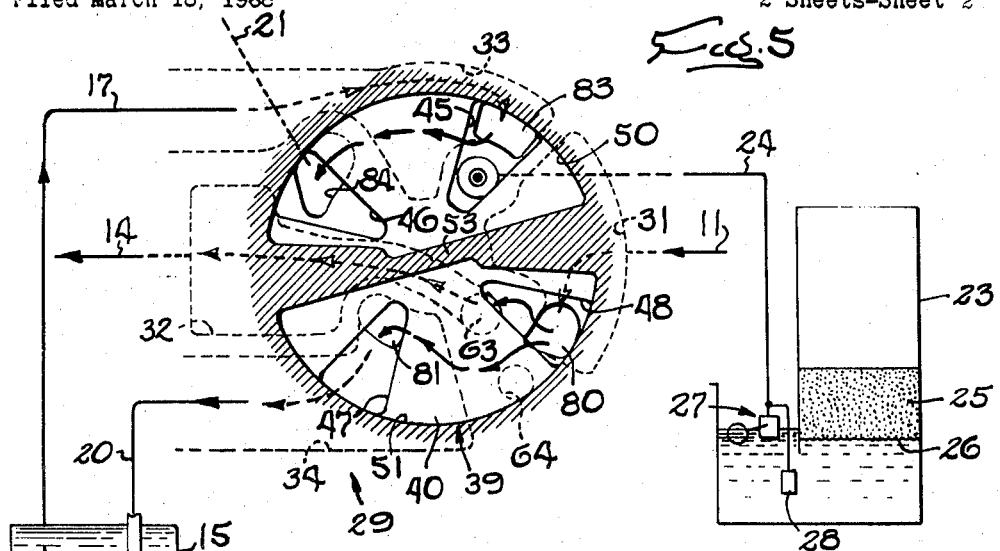
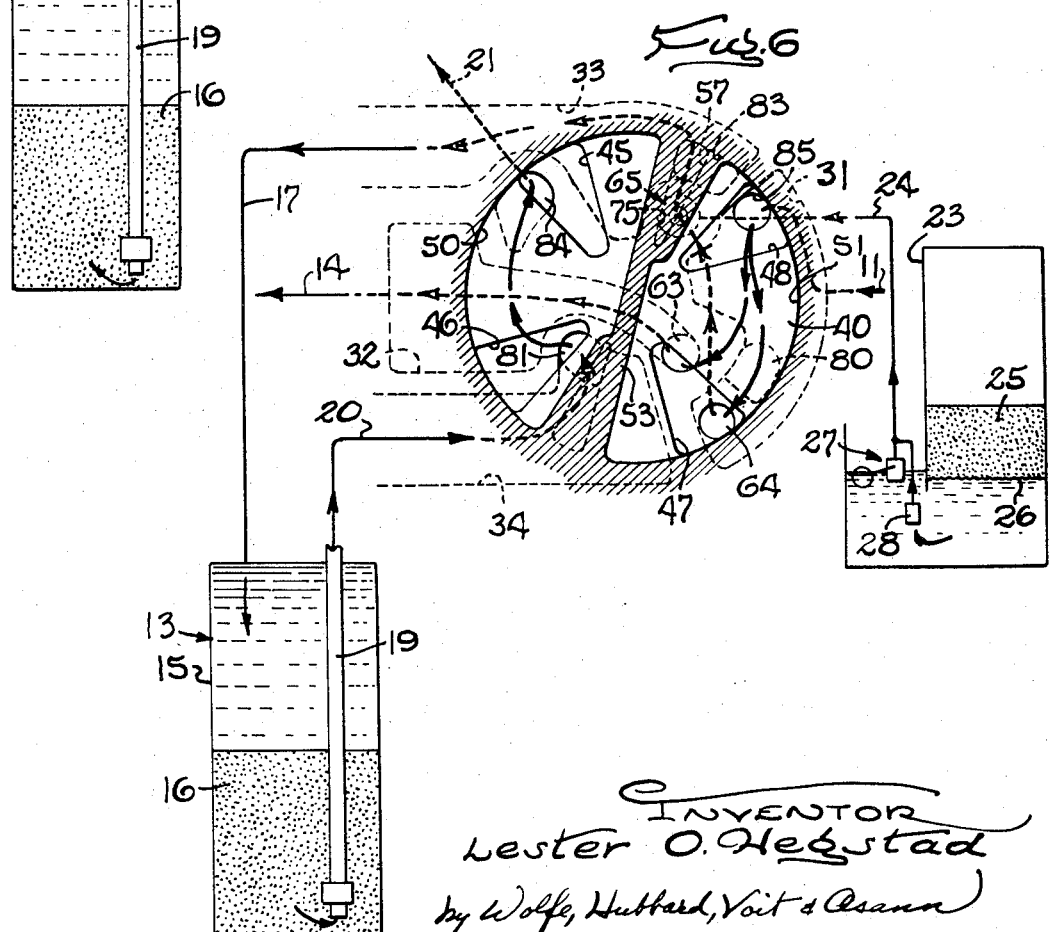
INVENTOR
Lester O. Hegstad
by Wolfe, Hubbard, Voit & Osann
ATTORNEY

United States Patent Office
3,476,151
Patented Nov. 4, 1969

3,476,151
WATER SOFTENER VALVE
Lester O. Hegstad, Rockford, Ill., assignor to Rockford Brass Works, Rockford, Ill., a corporation of Illinois
Filed Mar. 18, 1968, Ser. No. 713,770
Int. Cl. B01d 29/38; F16k 11/02
U.S. Cl. 137—625.29                                           14 Claims

ABSTRACT OF THE DISCLOSURE

A rotary valve for an automatic water softener with a brine tank includes a stationary valve member and a rotor, the latter being turnable to different positions on the valve member to switch the softener from a service condition to a backwash condition and then to a regeneration condition. Various ports, openings and passages formed in the valve member and the rotor are arranged to introduce a charge of soft water into the brine tank when the rotor is in its service position and to keep hard water out of the brine tank at all times in order to increase the service life of the tank.

BACKGROUND OF THE INVENTION

This invention relates to a rotary valve for controlling an automatic water softener of the type including a bed which is periodically backwashed and then regenerated with brine withdrawn from a brine compartment or tank formed either as a part of the softener itself or as a separate unit.

More particularly, the invention relates to a valve of the same general character as that disclosed in Anderson et al. Patent 3,177,899. Such a valve includes a stationary valve member formed with a series of ports and rotatably mounting a rotor which is turnable intermittently on the valve member through service, backwash and regeneration positions. The rotor includes a series of openings adapted to register with different ones of the ports in the different positions of the rotor to direct the proper flow of water and brine to and from the softener. The openings and ports are arranged such that hard water bypasses the softener and is available for service use during the time the softener is being backwashed and regenerated.

In the regeneration position of the rotor, brine is withdrawn from the brine tank and is directed through the softener bed to rejuvenate the latter. When the rotor thereafter is turned to the service position, a charge of water is introduced into the brine tank to dissolve part of the sodium chloride contained therein and form a fresh brine solution for use during the next period of regeneration of the softener.

SUMMARY OF THE INVENTION

The primary aim of the present invention is to provide a new and improved valve of the above character which is effective to charge the brine tank with soft water as opposed to hard water thereby to keep the impurities of the hard water out of the tank and increase the service life of the tank. More specifically, the invention resides in the unique arrangement of the ports and openings together with the formation of a novel flow passage in the rotor to introduce soft water into the brine tank while keeping hard water out of the tank.

A more detailed object of the invention is to provide a valve in which two full cycles of operation are completed during one revolution of the rotor and in which soft water is introduced into the brine tank once during each cycle.

Other objects and advantages will become apparent from the following detailed description taken in conjunction with the accompanying drawings.

BRIEF DESCRIPTION OF THE DRAWINGS

FIG. 5 is a schematic view of the valve and the water softening system and showing the rotor in its backwash position.

FIG. 6 is a view similar to FIG. 5 but showing the rotor in its regeneration position.

DETAILED DESCRIPTION OF THE PREFERRED EMBODIMENT

Figure 1:
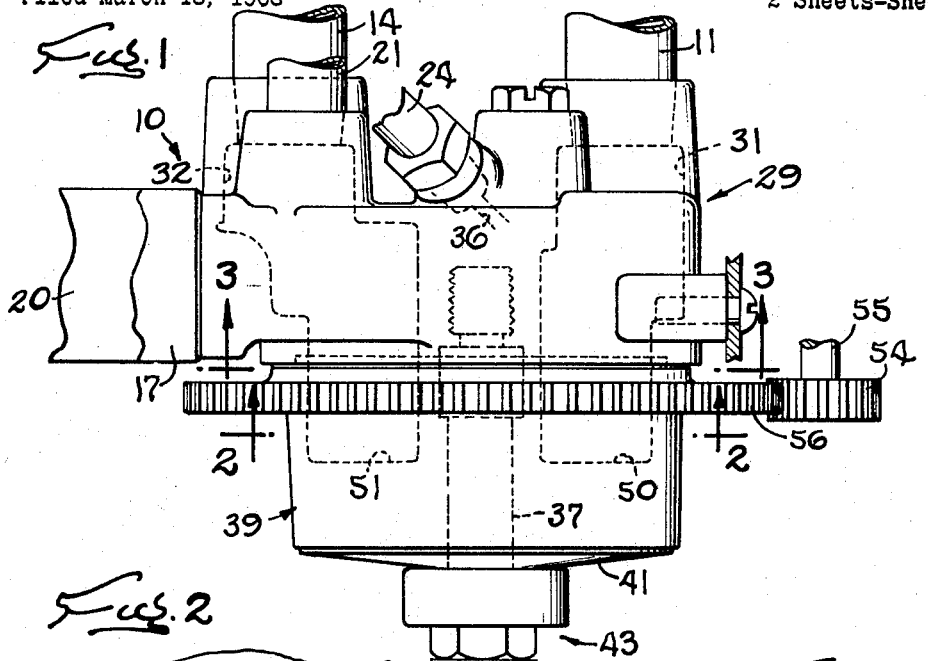
FIGURE 1 is an elevational view of a new and improved valve embodying the novel features of the present invention, the valve being shown connected into a water softening system.

As shown in the drawings for purposes of illustration, the invention is embodied in a rotary valve 10 adapted to control an automatic water softening system in which raw or hard water from a main or supply line 11 is first directed through a water softener 13 (FIG. 5) for softening and then is directed into a service line 14 for domestic or industrial use. The valve is controlled automatically by a timer (not shown) and is periodically conditioned to cause backwashing and regeneration of the softener.

Herein, the exemplary softener 13 includes a tank 15 (FIG. 5) within which is contained a mineral bed 16 consisting of resin, and other well known material of the type generally used in ion exchange softeners. In service use, hard water from the supply line 11 is admitted into the top of the tank through a softener inlet line 17 and is treated as it cascades downwardly through the bed. The resulting soft water thereafter passes upwardly through a riser pipe 19 and then into the service line 14 through a softener outlet line 20. At periodic intervals, the bed 16 is backwashed of all foreign material collected from the hard water and is regenerated with fresh brine. During backwashing, hard water from the supply line 11 is directed reversely through the softener outlet line 20, downwardly through the riser pipe 19, and then upwardly through the bed to fluff up the latter and to wash out the foreign material. The water then flows out of the softener through the softener inlet line 17 and is discharged into a service drain (not shown) through a drain line 21 (FIGS. 1 and 5). During the regeneration portion of the cycle, a charge of fresh brine is drawn out of a brine compartment 23 (FIG. 5) through a flow conduit 24, is mixed with hard water from the supply line 11, and is directed downwardly through the bed 16 through the softener inlet line 17 to regenerate the bed. The solution then flows upwardly through the riser pipe 19 and into the drain line 21 through the softener outlet line 20. When the softener is first returned to service use, a quantity of water is introduced into the brine compartment through the flow conduit 24 and dissolves a portion of a supply of salt 25 contained in the compartment so as to form another charge of brine which is withdrawn from the compartment the next time the softener is regenerated.

As specifically shown, the brine compartment 23 is formed as a separate tank although it is not uncommon to incorporate the brine compartment in the softener tank 15 itself. Salt 25 is stored in the upper portion of the brine tank 23 and rests on a screen 26 spaced above the bottom of the tank to leave space for water admitted into the lower end of the tank through the flow conduit 24. The latter communicates with the tank through a float-operated valve 27 which is adjusted to close off the flow of water into the brine tank after the water reaches a predetermined level above the screen. Brine withdrawn from the tank bypasses the float-operated valve and flows reversely into the conduit 24 through a check valve 28, the latter being closed when water is admitted into the tank.

Figure 3:
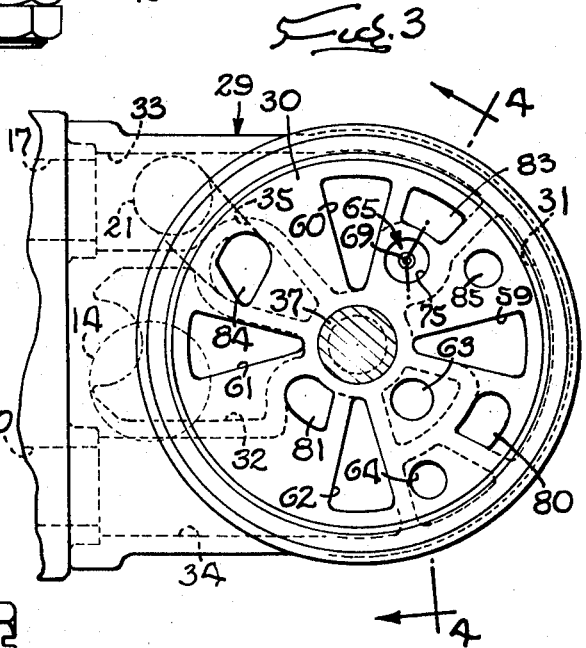
FIG. 3 is a fragmentary cross-section taken substantially along the line 3—3 of FIG. 1.

At predetermined intervals such as once every two days, the valve 10 automatically switches the softener 13 from a normal service condition into backwash and then into regeneration. In this instance, the valve includes a stationary valve member 29 (FIGS. 1 and 3) cast of brass and formed with a generally planar and circular-shaped face 30 (FIG. 3). Formed in the valve member are various passages 31, 32, 33, 34, 35 and 36 (FIGS. 1 and 3) connected at their exposed ends by suitable fittings to the supply line 11, the service line 14, the softener inlet line 17, the softener outlet line 20, the drain line 21 and the flow conduit 24, respectively. A series of ports (to be described in more detail below) are formed in the face 30 of the valve member and communicate with different ones of the lines through the passages.

Figure 2:
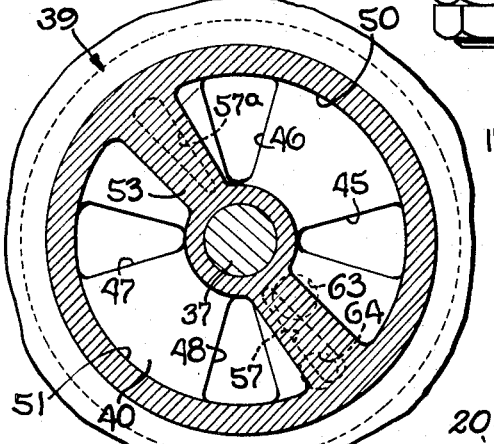
FIG. 2 is a fragmentary cross-section taken substantially along the line 2—2 of FIG. 1 and showing the rotor in its service position.

Projecting downwardly from the center of the valve member 29 is a stationary spindle 37 (FIG. 1) which rotatably mounts a hollow rotor 39 formed with a generally planar and circular-shaped face 40 coated with Teflon and disposed face-to-face with the face 30 of the valve member. A Belleville spring 41 is forced against the lower side of the rotor by a nut and thrust bearing assembly 43 on the free end of the spindle, and urges the face of the rotor into tight sealing engagement with the face of the valve member while still permitting rotation of the rotor on the spindle. The rotor is turnable intermittently to various angular positions on the valve member to switch over the softener 13 and is formed with a series of pie-shaped openings 45, 46, 47 and 48 (FIG. 2) arranged in pairs in the face 40 of the rotor and adapted to register with different ones of the ports in the valve member as the rotor is turned to its different positions. The openings 45 and 46 communicate with one another through a passage or internal chamber 50 (FIG. 2) formed in one-half of the hollow rotor while the openings 47 and 48 communicate with one another through a similar passage or chamber 51 formed in the other half of the rotor. The openings 45 and 46 are isolated from the openings 47 and 48 by a divider bar 53 extending across the rotor between the two chambers 50 and 51 and defining one side wall of each chamber. The divider bar is located beneath the face 40 within the hollow portion of the rotor and thus does not interrupt the continuity of the face.

To turn the rotor 39 on the valve member 29, a rotatable pinion 54 (FIG. 1) fast on the drive shaft 55 of an electric motor (not shown) meshes with gear teeth 56 formed around the periphery of the rotor. The motor is controlled by the timer in a well known manner and is energized intermittently to turn the rotor step-by-step. In this particular instance, the rotor moves through one-sixth of a revolution and switches the softener 13 to a different condition upon each step and is arranged to complete one service-backwash-regeneration cycle during each one-half revolution. Thus, two cycles of operation are completed as the rotor makes one whole revolution.

Figure 4:
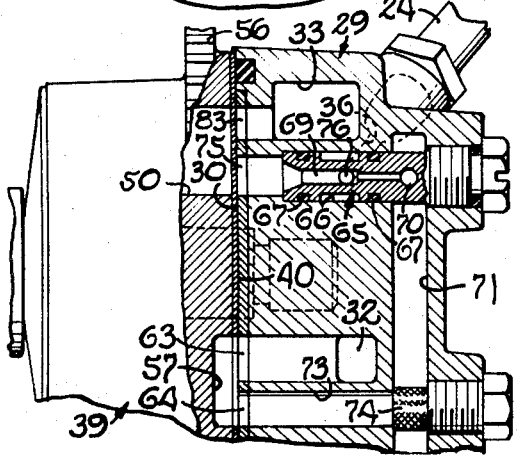
FIG. 4 is a fragmentary cross-section taken substantially along the line 4—4 of FIG. 3.

In accordance with the present invention, the ports in the valve member 29 and the openings 45 to 48 in the rotor 39 are uniquely arranged and coact with a novel passage 57 (FIGS. 2 and 4) formed in the rotor to introduce soft water into the brine tank 23 rather than charging the tank with hard water from supply line 11. For this purpose, the passage 57 establishes communication between the service line 14 and the flow conduit 24 in the service positon of the rotor so that a charge of soft water flowing through the service line is introduced into the flow conduit and the brine tank through the passage. As a result, the service life of the brine tank is increased since the tank is never filled with hard water and is kept free of iron and other hard water impurities which otherwise would accumulate in and adversely affect the tank.

In the present instance, the face 30 of the valve member 29 is formed with a total of twelve ports and includes four pie-shaped ports 59, 60, 61 and 62 (FIG. 3) which are identical in size to the similarly shaped openings 45 to 48 formed in the rotor 39. The port 59 communicates with the supply line 11 through the passage 31, the port 60 communicates with the softener inlet line 17 through the passage 33, the port 61 communicates with the service line 14 through the passage 32, and the port 62 communicates with the softener outlet line 20 through the passage 34.

When the rotor 39 is turned to its service position (see FIG. 2), the openings 45 to 48 in the rotor underlie and register with the ports 59 to 62, respectively, in the valve member 29. Thus, hard water admitted into the valve member through the supply line 11 passes into the rotor through the hard water port 59 and the rotor opening 45, crosses over to the opening 46 through the rotor chamber 50, and then passes into the softener inlet line 17 through the softener inlet port 60. Water in the inlet line 17 is softened as it cascades downwardly through the bed 16 and then flows upwardly through the riser pipe 19 into the softener outlet line 20. The soft water then flows from the softener outlet port 62 into the rotor through the opening 48, crosses over to the opening 47 through the rotor chamber 51, and enters the service line 14 through the service port 61.

Formed in the face 30 of the valve member 29 and communicating with the service port 61 through the passage 32 is an auxiliary service port 63 (FIG. 3) which, in the service position of the rotor 39, communicates with a port 64 leading to the flow conduit 24 and the brine tank 23. Such communication between the auxiliary port 63 and the port 64 is established by the passage 57 (FIG. 2) which herein is simply a shallow groove formed in the upper surface of the face 40 of the rotor along one side and adjacent one end of the divider bar 53, the groove being only sufficiently deep to define the flow passage 57 and being closed at its bottom by the material of the rotor face so that no communication exists between the passage 57 and the rotor chambers 50 and 51. Thus, soft water flowing to the auxiliary service port 63 crosses over into the port 64 through the grooved passage 57 when the rotor is in its service position shown in FIG. 2.

The port 64 defines the inlet port of a venturi 65 (FIG. 4) housed within the valve member 29 and communicating with the flow conduit 24 leading to the brine tank 23. As shown most clearly in FIG. 4, the venturi is sealed within a bore 66 of the valve member 29 by O-rings 67 and includes a restricted throat passage 69 having an opening 70 at one end communicating with the port 64 through passages 71 and 73 formed in the valve member, a filtering strainer 74 being located at the junction of the passages. The opposite end of the throat passage 69 communicates with a venturi outlet port 75 (FIGS. 3 and 4) formed in the face 30 of the stationary valve member. Formed in the venturi 65 intermediate the ends of the throat passage 69 is a hole 76 establishing communication between the throat passage and the passage 36 to which the brine conduit 24 is connected.

When the rotor 39 is in its service position (FIGS. 2 and 4), the outlet port 75 of the venturi 65 is closed by the face 40 of the rotor. Thus, soft water flowing into the venturi inlet port 64 through the grooved passage 57 is directed into the venturi through the passages 73 and 74 and the opening 70 and then flows from the venturi throat passage 69 into the brine tank 23 through the hole 76, the passage 36 and the flow conduit 24. As soon as the soft water has filled the brine tank to the required level, the float-operated valve 27 closes to stop further flow into the tank. The water in the flow system extending from the venturi inlet port 64 to the brine tank 23 then remains static during the remaining time the rotor is in its service position.

At the end of the service cycle, the rotor 39 is turned counterclockwise through one-sixth of a revolution to its backwash position (FIG. 5). In this position of the rotor, hard water from the supply line 11 flows into the valve member 29 through the passage 31 and a port 80 formed in the face 30 of the valve member. Part of this water passes directly into the auxiliary service port 63 and then into the service line 14 so that service water will be available during backwashing of the softener 13. The remainder of the hard water flowing into the valve member through the port 80 passes through the opening 48 into the rotor 39, crosses over to the opening 47 through the chamber 51, and then flows into the softener outlet line 20 through a port 81 formed in the face 30 of the valve member and communicating with the passage 34. After passing downwardly through the riser pipe 19 from the outlet line 20, the water flows upwardly through and collects foreign material from the bed 16 and leaves the softener through the softener inlet line 17. Thereafter, the dirty water enters into the valve member 29 through a port 83 formed in the face 30 and communicating with the passage 33, flows into the rotor through the opening 45, and crosses over to the opening 46 through the chamber 50. The water then passes into the drain line 21 through a drain port 84 formed in the face 30 and communicating with the passage 35. During the time the softener is being backwashed, the venturi inlet port 64 is covered by the face 40 of the rotor 39 as shown in FIG. 5 and thus no flow exists through the venturi throat passage 69 and the flow conduit 24.

After the softener 13 has been backwashed for a sufficient length of time, the rotor 39 is stepped counterclockwise through another one-sixth of a revolution to its regeneration position (FIG. 6). With the rotor in this position, hard water from the supply line 11 flows into the valve member 29 through the passage 31 and a port 85 formed in the face 30. The water passes into the rotor through the opening 48 and crosses over to the opening 47 through the chamber 51. Again, part of the hard water is directed into service line 14 through the auxiliary service port 63 in order that water will be available for service use while the softener is being regenerated.

The rest of the water flowing from the opening 47 passes into the venturi inlet port 64. As shown in FIG. 6, the grooved passage 57 underlies and opens the venturi outlet port 75 in the regeneration position of the rotor 39. As a result, water admitted into the venturi inlet port 64 flows into and through the throat passage 69 through the passages 73 and 74 and the opening 70, and then flows back into valve member through the venturi outlet port 75.

In flowing through the throat passage 69, the water creates low pressure within the throat passage and acts to suck the brine in the brine tank 23 into the throat passage. The brine is drawn from the brine tank through the check valve 28, the flow conduit 24, the passage 36 and finally into the throat passage 69 through the hole 76 in the venturi 65. The brine sucked into the throat passage 69 is mixed with the hard water flowing through the throat passage and passes with the water to the venturi outlet port 75. In the regeneration position of the rotor, the grooved passage 57 establishes communication between the venturi outlet port 75 and the softener inlet port 83 (FIG. 6) and thus the water and brine mixture flows from the outlet port 75 to the softener inlet port 83 through the grooved passage 57 and is directed into the softener inlet line 17. The mixture flows downwardly through and regenerates the bed 16 and then passes upwardly through the riser pipe 19 and into the softener outlet line 20. From this line, the fluid flows into the valve member 29 through the port 81, flows into the rotor 39 through the opening 46, crosses over to the opening 45 through the chamber 50, and finally is discharged into the drain line 21 through the drain port 84.

When the regeneration is completed, the softener 13 is ready for return to its service condition. The rotor 39 thus is indexed counterclockwise through another one-sixth revolution and again is moved to its service position. The openings 45 to 48 in the rotor aline with the pie-shaped ports 59 to 62 in the valve member 29 in the same manner as during the previous service cycle except that each opening is angularly spaced 180 degrees from the position it occupied during the previous cycle. To introduce soft water into the brine tank 23 when the rotor is in its service position during the second half of its revolution, an additional grooved passage 57a (FIG. 2) identical to the passage 57 is advantageously formed in the face 40 of the rotor and is spaced 180 degrees from the passage 57. Thus, when the rotor is turned to its service position the second time of each revolution, the passage 57a establishes communication between the auxiliary service port 63 and the venturi inlet port 64 so that soft water may flow through the passage and into the brine tank.

From the foregoing, it will be apparent that the new and improved valve 10 of the present invention is effective to introduce soft water into the brine tank 23 thereby resulting in longer and more trouble-free service from the tank. The passages 57 and 57a and the various ports and openings in the valve member 29 and the rotor 39 not only coact to direct soft water into and withdraw brine from the tank but also are arranged to keep hard water from entering the tank. That is, all of the ports communicating directly with the hard water supply line 11 are prevented by the rotor from communicating with the brine tank in the service position of the rotor so that it is impossible for hard water to flow to the brine tank.

We claim as our invention:

1. A valve for use with a water softening system in which water from a main normally is directed to a service line via a water softener having an inlet and an outlet and having a brine compartment communicating with a flow conduit; said valve comprising a stationary valve member having a generally planar face formed with a series of at least four angularly spaced ports; said ports respectively communicating with said main, said inlet, said outlet and said service line; a rotor having a generally planar face disposed face-to-face with the face of said valve member and mounted turnably on the valve member for intermittent rotation through service, backwash and regeneration positions; a series of at least four angularly spaced openings in the face of said rotor with each of said openings communicating with a different one of said ports when said rotor is in said service position; a passage in said rotor connecting said main opening and said inlet opening and establishing communication through such openings between said main port and said inlet port whereby hard water may flow from the main to the softener; a second passage in said rotor connecting said outlet opening and said service opening and establishing communication through such openings between said outlet port and said service line port whereby softened water may flow from said softener to said service line; two additional ports in the face of said valve body; one communicating with said service port and one communicating with said flow conduit, and an additional passage in said rotor and establishing communication between said additional ports in the service position of said rotor to direct soft water through said flow conduit into said brine compartment.

2. A valve as defined in claim 1 in which said additional passage comprises a groove formed in the face of said rotor and extending between said additional ports when said rotor is in said service position.

3. A valve as defined in claim 1 in which said rotor prevents the flow of hard water from said main port into said flow conduit when the rotor is in said service position.

4. A valve having a connection to a drain and adapted for use with a water softening system in which hard water from a main is normally directed to a service line via a water softener having an inlet and an outlet and having a brine compartment communicating with a flow conduit through which water is introduced into and brine is withdrawn from the compartment; said valve comprising a stationary valve member having a generally planar face formed with a series of spaced ports communicating with said drain, said main, said service line, said softener inlet and said softener outlet; a venturi in said valve member having an inlet port and an outlet port in said face; a hole in said venturi intermediate said venturi inlet port and said venturi outlet port and communicating with said flow conduit whereby brine from said brine compartment is sucked into said venturi by and mixes with water flowing from the venturi inlet port to the venturi outlet port; a rotor having a generally planar face disposed face-to-face with the face of said valve member and mounted turnably on the valve member for intermittent rotation through service, backwash and regeneration positions; a series of at least two pairs of angularly spaced openings in the face of said rotor with the openings of the first pair communicating with one another and the openings of the second pair communicating with one another; one opening of one pair of communicating with a main port and the other opening of such one pair communicating with a softener inlet port when said rotor is in said service position whereby hard water may flow from the main to the softener; one opening of the other pair communicating with a softener outlet port and the other opening of such other pair communicating with said service port when said valve is in said service position whereby softened water may flow from said softener to said service line; an additional port formed in the face of said valve member and communicating with said service port; said rotor preventing flow through said venturi outlet port when in said service position and being formed with a passage establishing communication between said additional port and said venturi inlet port to direct softened water into said flow conduit and said brine compartment through said venturi and said hole; one pair of said openings establishing communication between a main port, said service port and said venturi inlet port in the regeneration position of said rotor whereby hard water may flow from the main both into said service line and into said venturi; said passage establishing communication between said venturi outlet port and said softener inlet port in the regeneration position of said rotor whereby hard water flowing into the venturi sucks up and mixes with brine from said flow conduit and the mixture flows into said softener, and the other pair of said openings establishing communication between said softener outlet port and said drain port in the regeneration position of said rotor whereby the brine mixture flows from said softener to said drain.

5. A valve as defined in claim 4 in which said passage comprises a groove formed in the face of said rotor.

6. A valve as defined in claim 4 in which said rotor moves through said service, backwash and regeneration positions each time the rotor is turned through one-half revolution; and further including a second passage formed in said rotor and angularly spaced 180 degrees from said first passage; one of said passages establishing communication between said additional port and said venturi inlet port when said rotor is in said service position during the first one-half revolution of the rotor; and the other of said passages establishing communication between said additional port and said venturi inlet port when said rotor is in said service position during the second one-half revolution of the rotor.

7. A valve as defined in claim 6 in which each of said passages comprises a groove formed in the face of said rotor.

8. A valve as defined in claim 4 in which said rotor prevents flow between said venturi inlet port and said venturi outlet port in the service position of said rotor.

9. A valve as defined in claim 8 in which said rotor covers said venturi outlet port in the service position of said rotor to prevent flow between the venturi inlet port and the venturi outlet port.

10. A valve as defined in claim 8 in which said rotor prevents flow between said venturi inlet port and said venturi outlet port in the backwash position of said rotor.

11. A valve as defined in claim 10 in which said rotor covers said venturi inlet port in the backwash position of said rotor to prevent flow between the venturi inlet port and the venturi outlet port.

12. A valve as defined in claim 11 in which said rotor covers said venturi outlet port in the service position of said rotor to prevent flow between the venturi inlet port and the venturi outlet port.

13. A valve as defined in claim 4 in which said rotor prevents flow of hard water from said main into said venturi and said flow conduit in the service position of said rotor.

14. A valve for use with a water softening system in which water from a main normally is directed to a service line via a water softener having an inlet and an outlet and having a brine compartment communicating with a flow conduit; said valve comprising a stationary valve member having a generally planar face formed with a series of at least four angularly spaced ports respectively communicating with said main, said inlet, said outlet and said service line; a rotor having a generally planar face disposed face-to-face with the face of said valve member and mounted turnably on the valve member for intermittent rotation through service, backwash and regeneration positions; a series of at least two pairs of angularly spaced openings in the face of said rotor with the openings of the first pair communicating with one another and the openings of the second pair communicating with one another; one opening of one pair communicating with a main port and the other opening of such one pair communicating with a softener inlet port when said rotor is in said service position whereby hard water may flow from the main to the softener; one opening of the other pair communicating with a softener outlet port and the other opening of such other pair communicating with a service port when said rotor is in said service position whereby softener water may flow from said softener to said service line; an additional port formed in said valve member and communicating with said flow conduit; and means establishing communication between said service port and said additional port in the service position of said rotor to direct soft water through said flow conduit into said brine compartment.

References Cited

UNITED STATES PATENTS 2,146,983    2/1939    Pick _____ 137—625.29 X
3,177,899    4/1965    Anderson et al. ___ 137—625.29

ARNOLD ROSENTHAL, Primary Examiner